May 15, 1934.  C. F. HIRSHFELD  1,958,577
APPARATUS FOR DUST SEPARATION
Filed June 12, 1930  3 Sheets-Sheet 1
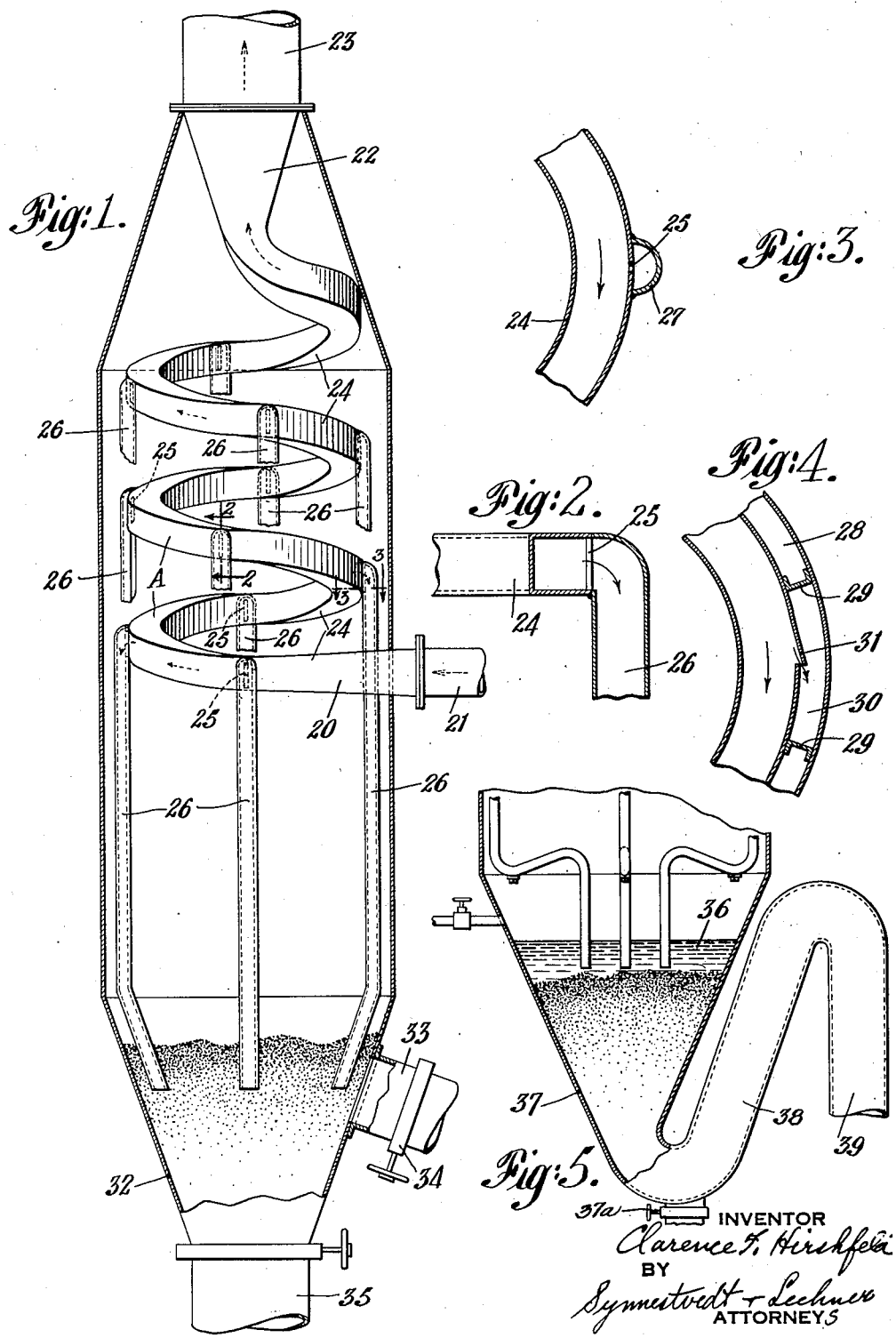

May 15, 1934.  C. F. HIRSHFELD  1,958,577
APPARATUS FOR DUST SEPARATION
Filed June 12, 1930  3 Sheets-Sheet 2
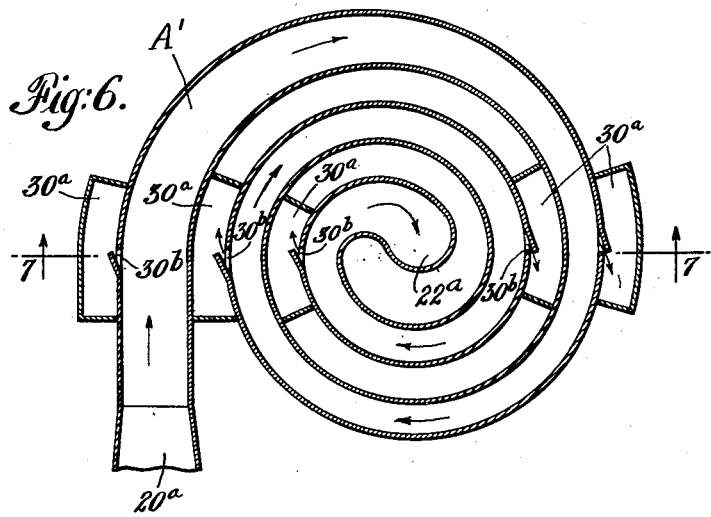
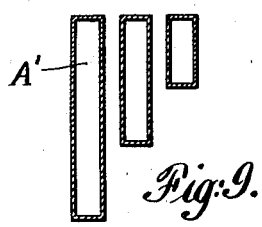
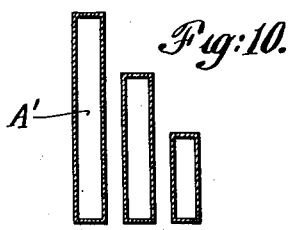
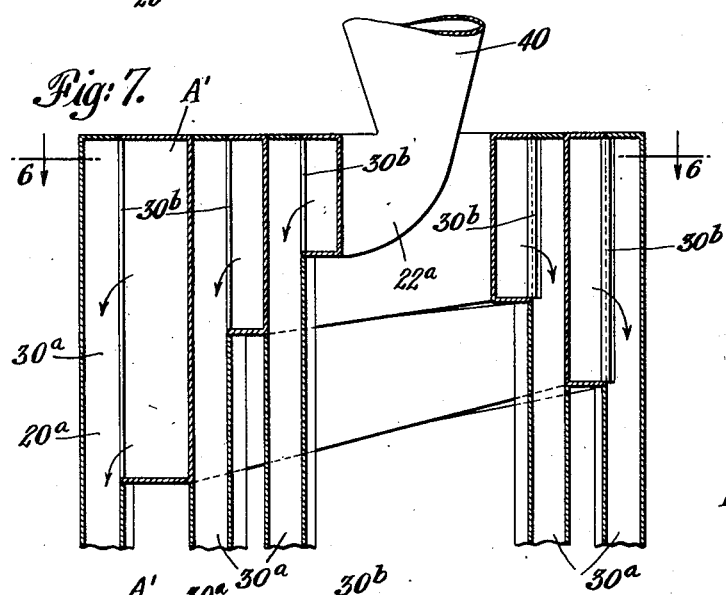
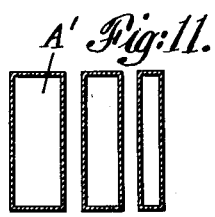
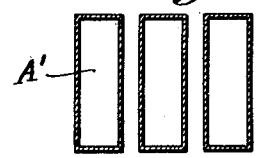
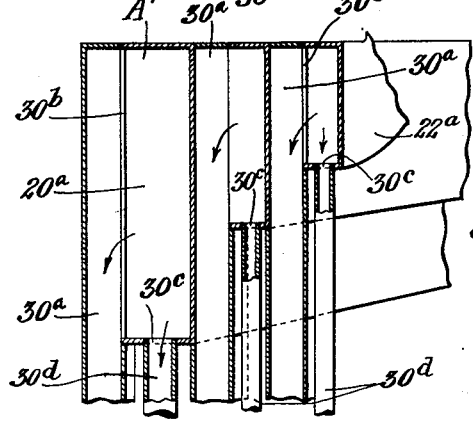
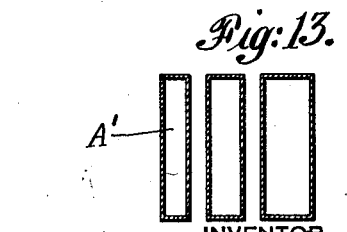
INVENTOR
Clarence F. Hirshfeld
BY
Symmestvedt + Lechner
ATTORNEYS May 15, 1934.  C. F. HIRSHFELD  1,958,577
APPARATUS FOR DUST SEPARATION
Filed June 12, 1930  3 Sheets-Sheet 3
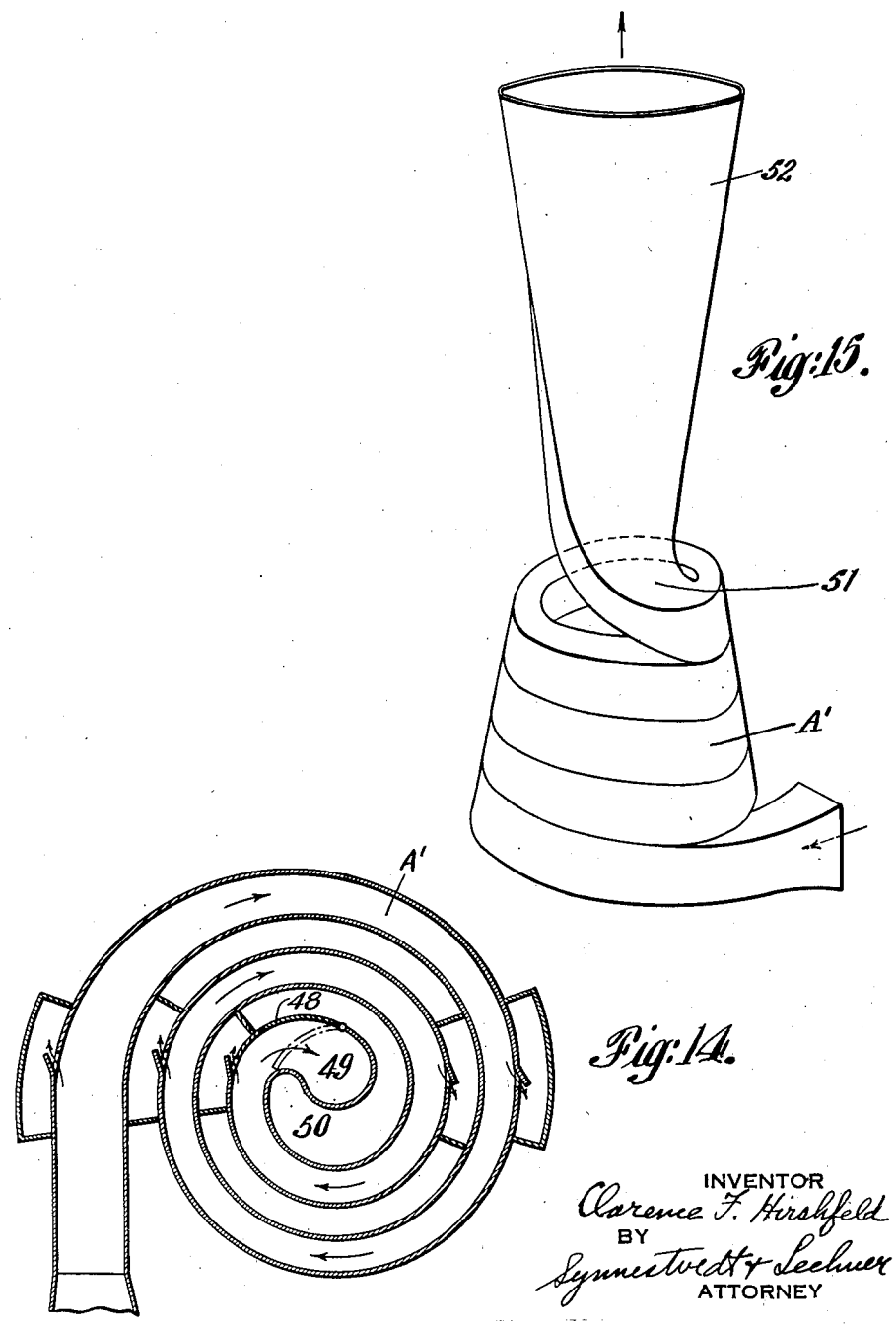

Patented May 15, 1934

1,958,577

UNITED STATES PATENT OFFICE 1,958,577

APPARATUS FOR DUST SEPARATION

Clarence F. Hirshfeld, Detroit, Mich.

Application June 12, 1930, Serial No. 460,584

7 Claims. (Cl. 183—85)

This invention relates to apparatus for separating dust and the like from gases and is particularly useful in the separation of finely divided ash from flue gases.

The purposes of the present invention will be best understood by reciting some of the limitations and difficulties existing in known methods of dust separation.

It has been customary for many years to employ what are known as "cyclone separators" for separating materials from gases. These have been fairly successful when the particles are large and heavy, but they become increasingly less efficient as the particles become lighter or smaller or both. Furthermore, such separators cause a high pressure drop when used in such a way as to involve high gas velocity. The above characteristics are due to the following facts.

First, the gases are not guided after they enter a cyclone separator and, therefore, they tend to take the shortest cut between entrance and exit openings, as will be readily understood when the entrance velocity and the direction thereof is taken into consideration.

Secondly, the material to be separated gravitates downwardly toward a dust collecting hopper located at the bottom of the cyclone but in so doing it passes through turbulent gas streams and eddies and much of the material is picked up again by the gas stream.

Thirdly, the unguided flow of the gas results in its losing practically all velocity energy in the form of heat so that substantially all energy supplied for moving it is lost. In fact, with many separators of this well known type, the original velocity energy is lost in the separator and the gas must be accelerated again within the separator in order to get out. This means that the original total head must be high enough to be sufficient for both purposes.

One of the primary objects of my invention is to overcome the foregoing difficulties and to provide a simple and effective apparatus which will accomplish the desired separation.

Another object of my invention resides in the provision of separating apparatus operating to guide the gases to follow a definite path giving sufficient centrifugal effect and length of time to cause effective separation of dust and the like from the gases.

A further object of my invention resides in the provision of a device for separating dust from gases in which pressure losses are kept to a minimum.

Still another object is to remove the dust and the like from the field of action as quickly as possible after it has been thrown to the outside of the gas stream.

More specifically it is an object of my invention to provide apparatus for freeing gases of dust in which the gases are passed through a coil and thereby caused to follow a definite path.

Stated in another way, I contemplate passing the gas to be cleaned through a walled passage adapted to guide the gas throughout its entire flow, to control the velocity and length of flow as required for effective centrifugal separation of dust or suspended liquid, and to change the gas velocity in such ways that there shall be a minimum loss of energy. I also contemplate removing the separated material in such ways that there shall be substantially no opportunity for the gas stream to pick up and transport material which has once been separated.

How the foregoing, together with such other objects and advantages as may hereinafter appear, or are incident to my invention, are realized, is illustrated in preferred form in the accompanying drawings wherein—

Fig. 1 is a sectional elevation of a separating apparatus constructed in accordance with my invention.

Fig. 2 is an enlarged fragmentary sectional view taken on the line 2—2 of Fig. 1.

Fig. 3 is an enlarged fragmentary plan section of a slight modification as it would appear if taken on the line 3—3 of Fig. 1.

Fig. 4 is a similar plan section of another modification.

Fig. 5 is a fragmentary sectional elevation illustrating a modification of the lower portion of the apparatus.

Fig. 6 is a plan section through a modified form of apparatus the section being taken on the line 6—6 of Fig. 7.

Fig. 7 is a vertical section through the apparatus shown in Fig. 6 and taken on the line 7—7 of that figure.

Fig. 8 is a fragmentary vertical section illustrating a modification of Fig. 7.

Figs. 9 to 13 are diagrammatic views illustrating other forms which the apparatus of Fig. 6 may take.

Fig. 14 illustrates a still further modification of the form shown in Figs. 6 and 7.

Fig. 15 illustrates a modification of the invention which is in the nature of a combination of the form shown in Fig. 1 and that shown in Fig. 6.

Referring now more particularly to the form of my apparatus illustrated in Fig. 1, it will be seen it comprises in general a tubular member or conduit A forming a walled passage through which gases to be freed of dust and the like are passed. This member has an inlet portion 20 at one end to which a gas inlet pipe 21 is secured, an outlet portion 22 at its other end to which a gas outlet pipe 23 is secured, and an intermediate coiled portion 24, in this instance in the form of a helix.

The inlet and outlet portions 20 and 22 are so shaped relative to the coiled portion 24 that the conduit A may be said to be a Venturi tube having a coiled or spiral throat, it being noted that if the spiral were made straight a true Venturi tube would result.

The dust containing gases enter the tube A at the bottom and leave it at the top and are guided to follow a definite path throughout their entire flow from the inlet to the outlet by means of the coiled portion 24, which portion gives sufficient centrifugal effect for a sufficient length of time to insure proper separation of dust and the like from the gases. The degree of centrifugal effect and the length of time during which it operates may be made to suit any particular requirement by properly choosing the cross sectional area, the diameter, and the number of turns of the helix. In this way the pressure loss due to frictional resistance may also be controlled within limits. Furthermore, the pressure loss due to unrecoverable velocity energy may be controlled within limits by the proper shaping of the inlet and outlet portions 20 and 22 which, in effect, constitute nozzles acting to accelerate and to decelerate the gases, respectively.

It will be apparent, therefore, that any desired fraction of the dust may be thrown toward the outside wall of the helix but such separation would be abortive unless provision were made for effectively removing the dust from the field of action, i. e., from the gas stream, and with this end in view I provide means for removing the dust substantially as it arrives at the outer walls of the helix, as will now appear.

In Fig. 1 I have provided a plurality of slots 25 in the outer wall or periphery of the helix, the slots being located at spaced intervals along the length of the helix. In this instance I have illustrated four slots to each turn of the helix. Each slot has associated therewith a discharge or drain pipe 26 through means of which the dust is conveyed away from the helix. The centrifugally thrown dust rolls and slides along the outer wall until it arrives at a slot and then passes through the slot into the discharge pipe. In Fig. 3 the discharge pipe is shown at 27. I also contemplate making the outer wall of the helix double as shown at 28 in Fig. 4 and employing partitions 29 to provide independent discharge passages 30 into which the dust discharges. The discharge slot is formed by pressing out the lip 31.

It is obvious that there will be a pressure drop along the length of the helix and therefore the pressure will normally be slightly lower at each successive slot. In view of this I propose to arrange the discharge pipes in such a manner that there can be no flow or circulation from the discharge end of one pipe into another, for if this could take place gas would pass through one slot down a discharge pipe, up another pipe further along the helix, and out of the corresponding slot, and this would cause separated dust to be picked up and carried back into the system. Of course, this could be accomplished by leading each discharge pipe to a separate dust hopper but such an arrangement would be too costly to be practical in most cases. Another way would be to make the resistance to gas flow through such a short circuit so high that gas cannot flow through fast enough to pick up any appreciable quantity of dust.

I prefer, however, to employ arrangements such as shown in Figs. 1 and 5, and referring first to Fig. 1 it will be seen that the discharge pipes all lead downwardly into a common hopper or container 32 and that the discharge ends of the pipes are sealed under a sufficient depth of dust to prevent short circuiting. In order to maintain the dust at the desired level I provide an outlet pipe 33 having a valve 34 which may be manipulated to control the level. A bottom valve controlled outlet pipe 35 may also be provided for completely cleaning out the container 32 when desired, although the valve of this outlet pipe is normally closed.

In the arrangement illustrated in Fig. 5 I provide a liquid seal 36 in the container 37 into which the dust pipes discharge. A trap 38 is provided in the outlet line 39. In this connection it is to be noted that since many dusts, when dry, flow like water, the arrangement of Fig. 5 may be employed without water. A valve controlled outlet 37a may be provided at the bottom of the hopper or container 37 for complete emptying of the container.

Referring now to Figs. 6 and 7 I have therein illustrated a modified form of apparatus in which the coiled gas conduit A' is in the form of a spiral having a gas inlet end 20a and a gas outlet end 22a. The cross sectional area of the conduit decreases from the inlet to the outlet end. In this instance the decrease is obtained by gradually bringing the vertical walls closer together and by inclining the floor of the conduit. It is to be understood, however, that in some cases it may be desirable to obtain the decrease in cross sectional area by inclining the floor only as shown in Fig. 9, by inclining the roof only as shown in Fig. 10, or by gradually bringing the vertical walls closer without change of roof or floor as shown in Fig. 11. I also contemplate any combination of the above.

The dust laden gas enters the spiral conduit A' at 20a, spirals its way toward the center, and leaves at the top through an upturned elbow 40 which is connected to the outlet end 22a of the conduit. Since the same weight of gas must flow through all cross sections of the spiral in any given time under conditions of steady flow and assuming there is no change in temperature or pressure from end to end, which is substantially true, the velocity will be inversely proportioned to the sectional area of the passage at each point, irrespective of the diameter of the spiral at such point. The centrifugal effect, however, is determined both by the velocity and by the diameter of the path of travel and, therefore, with a given velocity the centrifugal effect increases as the diameter of the path decreases. With a constant cross section of the tube making up the spiral as illustrated in Fig. 12, the centrifugal effect would become greater as the diameter of the successive turns becomes smaller. If, in addition, the cross section of the tube became smaller toward the center of the spiral as shown in Figs. 9, 10 and 11, the centrifugal effect would be increased still further. If, on the other hand, the cross section of the tube became larger toward the center, as shown in Fig. 13, any relation, within limits, could be obtained so that the centrifugal effect could be increased, maintained constant, or decreased as desired.

It is possible, therefore, to so proportion my apparatus as to obtain any durations of centrifugal action, any degree of centrifugal action, and any variation of centrifugal action along the path of flow that may be desired.

Also by ceasing to diminish the cross section as the center of the spiral is approached, or even by starting an increase in cross section, the gas may be slowed down gradually so as to recover much of the velocity energy without at the same time substantially decreasing the centrifugal effect and thereby the advantage may be gained of a long path for separation without a proportionate loss in head.

In order to remove the separated dust in the spiral form of apparatus I may employ arrangements similar to those described in connection with the first form of my invention and in Figs. 6 and 7 I have shown a plurality of discharge conduits 30a into which the dust passes through the openings 30b located at spaced points along the outer wall of the spiral tube.

In Fig. 8 I have shown a modification in which dust is also removed through the floor of the spiral as by means of slots 30c in the floor with which discharge pipes 30d are associated.

Referring to the modification illustrated in Fig. 14, I have hinged a portion 48 of the outer wall of the spiral whereby the path of travel of the gases may be lengthened by moving the hinged portion to the position shown in dot and dash lines in which case the gases, instead of passing to the space 49, are forced to enter the space 50 and thus travel further in the spiral path. This additional path may be made of such length and cross section as to obtain adequate separation at low rates of gas flow when the additional velocity or length of path is not too costly of energy. The portion 48 is swung to its full line position for greater gas flow, in which event the space 49 becomes the end of the spiral. In both instances the gases leave the separator through a suitable gas outlet.

In the modification shown in Fig. 15 the gas conduit is in the form of a spiral helix. The diameter of the coil decreases from bottom to top and the coil turns up at 51 into the discharge nozzle 52. It is to be understood that provision for removing the separated dust may be made in accordance with arrangements above described. This form of my invention may be adapted for different quantities of gas in a manner similar to that illustrated in Fig. 14, i.e., a full load nozzle may be provided to take off at the second or third coil from the top and into which the gases would be deflected by a hinged gate such as shown in Fig. 14. The arrangement is well adapted to be built into the base of a stack.

From the foregoing it will be seen that I have provided a very simple, inexpensive, and effective dust separating apparatus in which the gases are guided throughout their entire flow. Through the practice of my invention the velocity and length of flow of the gases may be controlled as required for adequate centrifugal separation of dust or suspended liquid and the gas velocity may be changed in such ways to effect a minimum loss of velocity energy, and in addition the separated material may be removed in such a way that it will not be picked up by the gas stream once it has been separated.

I claim:

1. Separating apparatus including a coiled tube having a gas inlet portion and a gas outlet portion and being of progressively reduced cross-sectional area in the direction of flow of the gases, a plurality of outlets spaced along the coiled portion of the conduit for the discharge of dust centrifugally separated from the gases passing through the conduit, a dust container, and a plurality of discharge conduits for leading dust discharging from the coiled tube to said container, said discharge conduits being adapted to be sealed from one another.

2. Separating apparatus including a coiled tube having a gas inlet portion and a gas outlet portion and being of progressively reduced cross-sectional area in the direction of flow of the gases, a plurality of outlets spaced along the coiled portion of the conduit for the discharge of dust centrifugally separated from the gases passing through the conduit, a dust container, a plurality of discharge conduits for leading dust discharging from the coiled tube to said container, said discharge conduits extending into said container with their discharge ends located below the dust contained therein.

3. Separating apparatus including a coiled Venturi tube having a gas inlet portion and a gas outlet portion, a plurality of outlets spaced along the coiled portion of the conduit for the discharge of dust centrifugally separated from the gases passing through the conduit, a dust container, a plurality of discharge conduits for leading dust discharging from the coiled Venturi tube to said container, and means for maintaining a predetermined level of water in said container, said discharge conduits extending into said container with their discharge ends located below said water level.

4. Separating apparatus including a coiled tube having an inlet for gas to be freed of dust, and an outlet for cleaned gas, said coiled tube guiding the gas to follow a definite path from inlet to outlet and being of progressively reduced cross-sectional area in the direction of flow of the gases throughout the entire dust separating zone, a plurality of openings arranged at intervals along the length of said tube for the discharge of the separated dust, a dust container, an individual discharge conduit for each of said openings and leading therefrom to the dust container, and means providing a seal against gas communication between conduits at their discharge ends.

5. Separating apparatus including a coiled tube having an inlet for gas to be freed of dust at one end and an outlet for cleaned gas at the other end, said tube being of progressively reduced cross-sectional area in the direction of flow of the gases throughout the entire dust separating zone and the coils of said tube changing in diameter from the inlet to the outlet with the coil of smallest diameter at the outlet, means for peripherally removing separated dust from the coiled tube including a plurality of discharge openings spaced apart along the length of the tube a dust container, and a plurality of discharge conduits for leading dust from said discharge openings to said container, said conduits being adapted to be sealed from one another.

6. Separating apparatus including a spiral tube having an inlet at its outer portion for gases to be freed of dust and an outlet at its inner portion for cleaned gases, said spiral tube being of progressively reduced cross sectional area in the direction of flow of gases throughout the entire dust separating zone, a plurality of conduits communicating with the interior of said tube at spaced points along its periphery for the discharge of dust centrifugally thrown from the gases in their passage through the tube and means providing a seal against gas communication between conduits at their discharge ends.

7. Separating apparatus including a coiled tube having a gas inlet portion and a gas outlet portion, the said tube being constructed and arranged to be progressively ascending in the direction of flow of the gases throughout the entire dust separating zone, a plurality of outlets spaced along the coiled portion of the conduit for the discharge of dust centrifugally separated from the gases passing through the conduit, a dust container, and a plurality of discharge conduits for leading dust discharging from the coiled tube to said container, said discharge conduits being adapted to be sealed from one another.

CLARENCE F. HIRSHFELD.